United States Patent [19]

Kaplinsky

[11] Patent Number: 4,714,937

[45] Date of Patent: Dec. 22, 1987

[54] INK DELIVERY SYSTEM

[75] Inventor: George T. Kaplinsky, San Diego, Calif.

[73] Assignee: Hewlett-Packard Company, Palo Alto, Calif.

[21] Appl. No.: 914,225

[22] Filed: Oct. 2, 1986

[51] Int. Cl.[4] .............. G01D 15/16

[52] U.S. Cl. .............. 346/140 R

[58] Field of Search .......... 346/140 R, 140 A, 140 PO

[56] References Cited

U.S. PATENT DOCUMENTS

| | | | |
|---|---|---|---|
| 4,392,147 | 7/1983 | Rösel | 346/140 R |
| 4,403,233 | 9/1983 | Terasawa et al. | 346/140 PD |
| 4,489,335 | 12/1984 | Watanabe et al. | 346/140 PD |
| 4,542,390 | 9/1985 | Bruning et al. | 346/140 PD |

*Primary Examiner*—A. D. Pellinen

*Assistant Examiner*—Derek S. Jennings

*Attorney, Agent, or Firm*—William J. Bethurum

[57] ABSTRACT

An ink delivery system (10) comprising an ink bag or reservoir (14), a bladder (16) and a print head (24) is provided. A valve (38) provides selected fluid communication to permit total closure (no ink flow), fluid communication from the ink bag to the bladder (refill mode) and fluid communication from the bladder to the print head (print mode). The ink bag comprises a material impervious to air and water and bladder comprises a resilient material capable of several refills. Both are mounted on one side of a platform support (12). The valve is mounted in a plenum chamber (22) on the oppsite side of the platform support and is provided with a rotatable valve stem (50) to permit rotation of the valve to its various modes. The print head is mounted on the plenum chamber.

15 Claims, 11 Drawing Figures

Fig. 1.
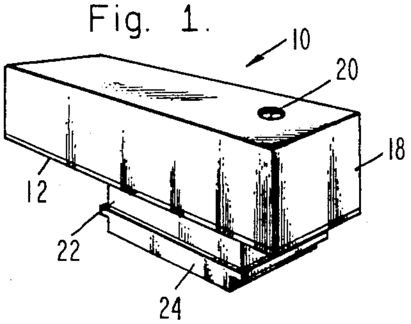
Fig. 2.
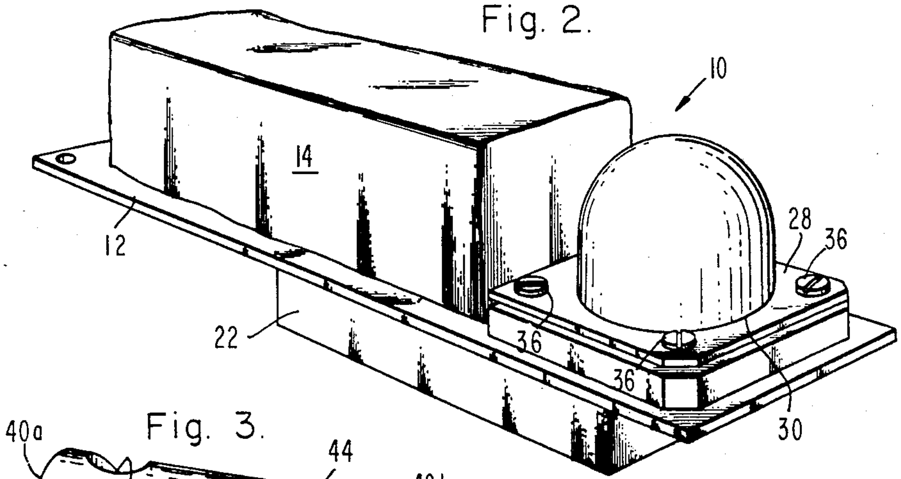
Fig. 3.
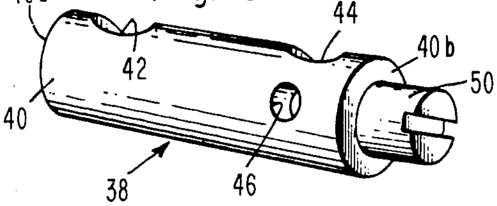
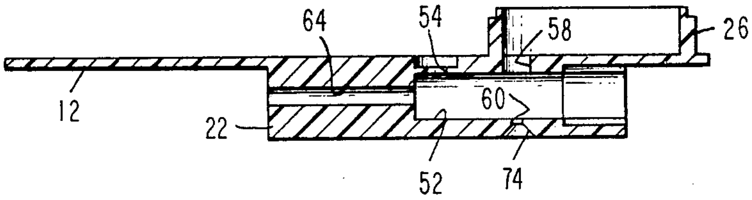
Fig. 4.

Fig. 5.
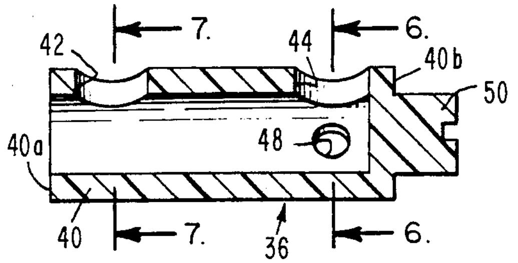
Fig. 6.
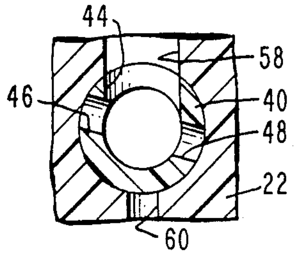
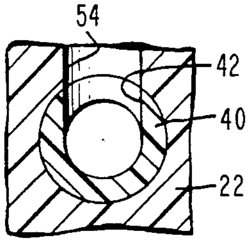
Fig. 7.
Fig. 8.
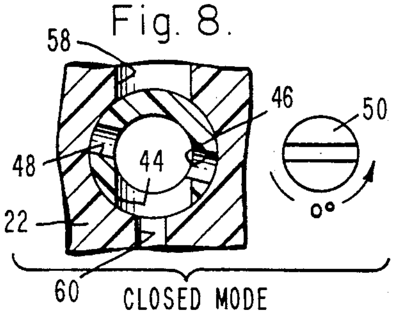
Fig. 9.
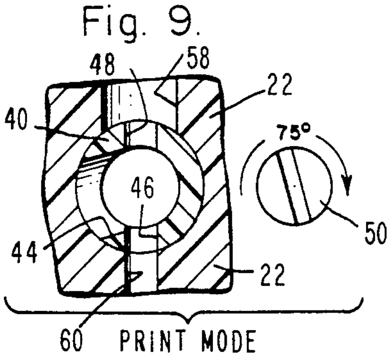
Fig. 10.
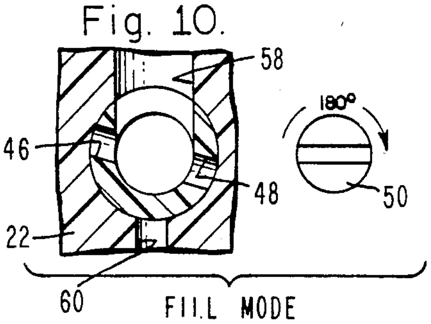
Fig. 11.
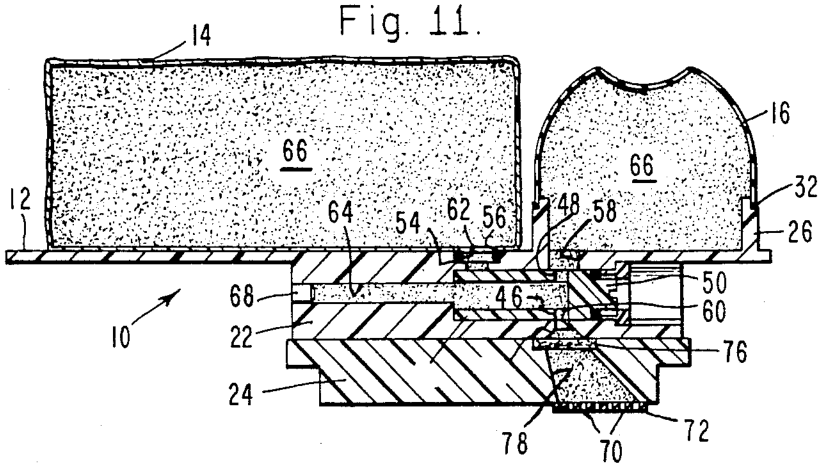

INK DELIVERY SYSTEM

TECHNICAL FIELD

This invention relates to ink-jet printers, and, more particularly, to a self-contained print head for thermal ink-jet printers, used in plotters.

BACKGROUND ART

Present plotters employ an ink delivery system comprising an ink-jet pen fed by an ink-loaded foam reservoir. A vent hole is formed near the top for providing atmospheric pressure in the foam region so that the ink can be drained. A filter is situated in the bottom of the reservoir to trap particles. A manifold attached to the bottom of the reservoir distributes ink from the reservoir to an ink-jet print head, which comprises a plurality of nozzles in a nozzle plate. The nozzles are associated with thermal means, such as thin film resistors, to form selected bubbles of ink, which are propelled to a printing medium, such as paper. However, the foam ink delivery system has several drawbacks.

For example, air bubbles can be trapped in the foam and create air channels, resulting in depriming of the ink-jet print head and the nozzles. Also, it is difficult to completely fill the foam with ink during manufacturing. Additionally, a very large filter is required at the bottom area of the reservoir or pen body to permit an even and full drainage of the foam. The high cost of such filters increases the cost of the system considerably.

Further disadvantages include the possibility of migration of air bubbles down the manifold, below the filter area, resulting in "unprimable" bubbles. Also, the foam is about 70% efficient; that is, only about 70% of the ink in the reservoir can be conveyed to the print head.

In addition, the ink is unstable if the pen is moved onto its side. Due to the instability, shipping of the pen often results in depriming, thereby necessitating a more complex preparation and again increasing the cost of the pen.

The vent hole allows air-ink contact, which may affect the long-term viscosity of the ink. Also, ink drainage from one batch of foam to the next is not repeatable. Thus, the operator of the plotter cannot tell whether a pen can complete a plot.

Finally, ink level in the reservoir is detectable only by one of two methods. In the first method, nozzle firings are counted. However, it is easy to lose count of the number when the pen is moved to a service station on the plotter if, for instance, the user wants a different color pen. The plotter then loses count for the old pen firings.

Alternately, a tachometer method may be employed. This method consists of a mechanically acutated memory that is located on the pen after a plot, the drop count is converted to the volume of ink used up, and the memory on the pen changed accordingly. Before a new plot, this memory is checked to determine if enough ink is present to start plotting.

Thus, it is clear that the present foam system has several drawbacks which detract from its usefulness. Accordingly, an improved ink delivery system is needed which avoids most, if not all, the foregoing problems.

DISCLOSURE OF INVENTION

Accordingly, it is an object of the present invention to provide an ink delivery system that prevents contact of the ink with air and avoids depriming problems, no matter how created.

It is another object of the present invention to provide an ink delivery system that is easy to manufacture, requires few parts and is stable in any position.

It is yet another object of the present invention to provide an ink delivery system that delivers a repeatable volume of ink.

It is still another object of the invention to provide an ink delivery system that is amenable to several means of detecting the ink level therein.

These and further objects of the invention will become more readily apparent upon a consideration of the appended drawings taken in conjunction with the following commentary.

Briefly, the ink delivery system of the invention comprises in combination:

(a) an ink bag for storing a quantity of ink;

(b) a print head for delivering ink to a printing medium;

(c) a bladder for providing a supply of ink to the print head at a controlled pressure;

(d) a valve for providing a closed mode, a refill mode, wherein ink is conveyed from the ink bag to the bladder, and a print mode, wherein ink is conveyed from the bladder to the print head; and (e) means for supporting the ink bag, the bladder, the print head and the valve in cooperative association.

Advantageously, there are no air bubbles in the system, the ink delivery system delivers virtually all the ink in the device, the system is stable in any orientation and thus is insensitive to position during shipping, the ink is isolated from the air, electrical ink level sensors may be employed, and each ink delivery system is reproducibly manufactured.

BRIEF DESCRIPTION OF THE DRAWINGS

FIG. 1 is a perspective view of the ink delivery system of the invention;

FIG. 2 is a view similar to that of FIG. 1, with the cover removed and the print head not shown, depicting a platform support for supporting the ink delivery system, an ink bag and bladder supported on one surface thereof, and a manifold supported on the opposite surface thereof;

FIG. 3 is a perspective view of a three-way valve used in the practice of the invention;

FIG. 4 is a longitudinal cross-sectional view of the platform support and manifold of FIG. 2;

FIG. 5 is a longitudinal cross-sectional view of the three-way valve;

FIG. 6 is a cross-sectional view taken along the line 6—6 of FIG. 5;

FIG. 7 is a cross-sectional view taken along the line 7—7 of FIG. 5;

FIG. 8 is a cross-sectional view similar to that of FIG. 6, showing the valve in the closed mode;

FIG. 9 is a cross-sectional view similar to that of FIG. 6, showing the valve in the print mode;

FIG. 10 is a cross-sectional view similar to that of FIG. 6, showing the valve in the refill mode; and FIG. 11 is a cross-sectional view of the ink delivery system of the invention, showing the valve in the print mode.

BEST MODES FOR CARRYING OUT THE INVENTION

Referring now to the drawing wherein like numerals of reference designate like elements throughout, an ink delivery system is depicted generally at 10. The ink delivery system or apparatus 10 comprises a support platform 12, which supports an ink bag 14 and a hemispherical bladder 16 on a first major surface thereof. A cover 18 is provided for protection of the ink bag 14 and bladder 16. The cover has an opening 20 formed therein, positioned over the bladder 16, for providing access to the top surface of the bladder, for reasons which will become apparent from the discussion below.

On the opposite major surface of the platform 12 is a plenum chamber 22 and an ink-jet print head 24. The plenum chamber is operatively associated with the ink bag 14 and bladder 16 and the print head 24 is operatively associated with the plenum chamber 22, as more fully described below.

The ink bag or reservoir 14 comprises a material that is impervious to air and water and exhibits little or no resistance to collapse. Advantageously, the ink bag 14 comprises an aluminum-coated plastic bag of volume of about 200 $cm^3$, although other volumes may, of course, be employed. The ink bag 14 is conveniently secured to the platform 12 by a suitable adhesive.

The hemispherical bladder 16 comprises an elastomeric material having memory, and is mounted on a stand-off 26 (shown more clearly in FIG. 11). The bladder 16 conveniently comprises ethylene propylene, having an effective volume of about 15 $cm^3$, capable of providing ink delivery to the print head 24 at a pressure between $-0.5$ to $-6$ inches of water, and preferably about $-1$ to $-3$ inches of water, depending on the thickness of the bladder wall and the size of the stand-off 26. Again, other volumes may be employed in conjunction with the ink bag 14.

The hemispherical bladder 16 is secured to the stand-off 26 by a clamp plate 28 having an opening 30 therein for accepting the bladder. The clamp plate 28 urges the bottom lip 32 of the bladder 16 against the stand-off 26 and is secured to a support member 34, which surrounds the stand-off 26, by means such as screws 36.

The plenum chamber 22 is secured to the platform 12 by any suitable mechanical means, such as screws (not shown) or may be fabricated integral therewith. The plenum chamber, like the platform 12, conveniently comprises a molded, rigid plastic material.

The print head 24 advantageously comprises a thermal ink-jet printing unit, although other printing units, such as piezoelectric, may also be employed in the practice of the invention.

A three-way valve 38 is used to interconnect the ink bag 14, the bladder 16 and the print head 24, as described below. The three-way valve 38 comprises a substantially cylindrical, hollow body 40, advantageously of a molded, rigid plastic material, having openings 42 (operatively associated with the ink bag 14), 44 (operatively associated with the bladder 16) and a pair of openings 46, 48 (operatively associated with the bladder 16 and print head 24). Opening 42 is disposed near one end 40*a* of the valve 38, while opening 44 is disposed near the opposite end 40*b*. Openings 46, 48 are also disposed near the end 40*b*, and are opposed to each other and located on the valve body 40 at an angle to the opening 44.

The three-way valve 38 is also provided with a stub rotating means 50, mounted on one end 40*b* of the cylindrical body 40, and preferably integral therewith. The rotating means 50 is conveniently slotted to be engaged by a rotatable blade (not shown) for rotation of the three-way valve 38.

Finally, the valve 38 is open at the opposite end 40*a*, to enable filling the ink-bag 14 during manufacture, as described more fully below.

The three-way valve 38 is located in the plenum chamber 22, in a similarly-shaped opening 52 to permit rotation of the valve 38. The rotating means 50 is accessible to the rotatable blade to permit engagement of the rotatable means 50.

The plenum chamber 22 is provided with (a) an opening 54 which provides fluid communication with the ink bag 14 through an opening 56 therein, (b) an opening 58 which provides fluid communication with the bladder 16, and (c) an opening 60 which provides fluid communication with the print head 24. The opening 56 of the ink bag 14 is secured to the opening 54 of the plenum chamber 22 by press-fit therearound, using a gasket 62.

As seen in FIGS. 6 and 7, the opening 44 in the three-way valve 38 communicates with the opening 58 in the plenum chamber 22, while the opening 42 in the three-way valve 28 communicates with the opening 54 in the plenum chamber 22. As seen in FIG. 9, the openings 46, 48 provide fluid communication between opening 58 and opening 60 in the plenum chamber 22.

The three positions of the three-way valve 38 are depicted in FIGS. 8–10. In FIG. 8, the valve 38 is shown in the closed mode. All ports or openings are in such a position that there is no fluid communication between the ink bag 14 and the bladder 16 or between the bladder 16 and the print head 24. The rotatable means 50 is shown in its initial position.

In FIG. 9, the valve 38 is shown in the print mode. In this position, there is no fluid communication between the ink bag 14 and the bladder 16. However, there is fluid communication between the bladder 16 and the print head 24 by means of openings 46, 48, which are operatively associated with openings 60 and 58, respectively, in the plenum chamber 22. The rotatable means 50 is shown rotated about 75° from its closed position. The angle of about 75° ensures that fluid communication is established with the opening 58 prior to being established with the opening 60.

In FIG. 10, the valve 38 is shown in the refill mode. In this position, there is no fluid communication between the bladder 16 and print head 24. However, there is fluid communication between the ink bag 14 and the bladder 16 by means of openings 42 and 44, which are operatively associated with openings 54 and 58 in the plenum chamber 22 (reference is also made to FIGS. 4, 5 and 7). The rotatable means 50 is shown rotated 180° from its initial closed position.

While a specific valve 38 is depicted above, other valve configurations which accomplish the same functions are also contemplated as falling within the scope of the invention.

The plenum chamber 22 is also provided with a bore 64, which is operatively associated with the open end 40a of the valve 38. The bore 64 permits filling the ink bag 14 during manufacture with ink 66, with the valve 38 in the refill mode. In this mode, the bladder 16 is also filled. The bore 64 is then sealed with plug 68 and the valve 38 is rotated to the shipping mode.

Initiation of printing is achieved by forming a small dimple in the top of the bladder 16. Mechanical dimpling of the bladder 16 is accomplished by depressing the top of the bladder by a blunt tool to a predetermined depth, with the valve 38 in the refill mode. Where a cover 18 is utilized to protect the bladder 16, the opening 20 comprises a dimpler hole for this purpose.

The dimpling action results in some of the ink flowing back into the ink bag 14. Then, the valve 38 is rotated so as to provide fluid communication between the bladder 16 and the print head 24.

The dimpled bladder 16 is capable of operating at the negative pressure required to hold the ink back and prevent the ink from freely flowing out through nozzles 70 in nozzle plate 72. When dimpled, the bladder 16, because of its elastic memory, wants to return to its original configuration, thereby generating the negative pressure.

The function of the nozzles 70, beside firing drops of ink, is to prevent the ink from flowing back to the bladder due to the negative pressure. The nozzles 70 achieve this by the surface tension generated at the nozzles due to their capillarity. This capillarity can support up to −12 inches of water.

FIG. 11 depicts the ink delivery system 10 in its full condition, prior to printing but after dimpling. The valve 38 is shown in the print mode.

The ink passes from the bladder 16 into opening 58 in the plenum chamber 22, then opening 48 in the valve 38 and into the interior of the valve. The ink 66 then exits from the valve 38 through opening 46 into opening 60 in the plenum chamber 22.

From the opening 60, the ink passes into an inverted funnel chamber 74 in the plenum chamber 22, then through a filter 76 in the print head 24. From the filter, the ink 66 passes into an ink feed channel chamber 78, where it is delivered to the plurality of nozzles 70 in the nozzle plate 72. Resistors (not shown) associated with the nozzles 70 control the firing of bubbles of ink, as is well-known for thermal ink-jet print heads 24.

The purpose of the ink delivery system of the invention is to provide ink to a thermal ink-jet unit (or other ink-jet unit). The system provides the ink at a prescribed negative pressure and in a quantity required by the life of the printing head.

The ink delivery system of the invention is intended for use with ink plotters of the type used to prepare large drawings and is mounted on a carriage (not shown), which is electronically driven by a computer (not shown), in the memory of which the drawing is stored.

The presence of the ink bag 14 permits several refills of the bladder 16, thereby enabling more extended use of the print head 24 (which is capable of many more print cycles than provided by the size of the bladder 16).

The ink bag 14 gradually collapses as its contents are transferred to the bladder 16. The bladder, on the other hand, comprising a resilient material, may be refilled several times from the ink bag.

The bladder 16 is sized to contain sufficient ink for a metric A∅ plot (which is slightly larger than standard at blackout (that is, with all nozzles 70 in the print head 24 firing. The bladder, due to the composition of the wall and its thickness, provides the necessary negative pressure to prevent dripping of the ink 66 at the nozzle-plate 72 level.

After a plot is completed, the carriage supporting the ink delivery system 10 is returned to a service station of the plotter (not shown), where an actuator (not shown) engages the rotatable means 50 and changes the configuration of the valve 38 from the print position (bladder 16 to head 24) to the refill position (ink bag 14 to bladder 16) for a predetermined period of time, to allow a complete refill of the bladder.

The bladder 16 is next dimpled, as described above. The actuator then turns the valve 38 to the print position. At this point, the ink delivery system 10 is ready for another plot.

The ink delivery system 10 of the invention is a self-contained passive unit. Its advantages are that there are no air bubbles in the system (air bubbles cause depriming), it provides efficient delivery (virtually all of the ink in the ink bag 14 can be used), it is stable in any orientation (useful in shipping), ink is isolated (the closed position of the valve 38 isolates the ink from the outside environment, and hence the ink is at no time exposed to air, except at the nozzles 70), it is capable of ink level sensing (whether electronically, mechanically or visually), and is capable of being reproducibly manufactured (the bladders 16 can be made to respond in the same manner with each unit 10).

As the lifetime of the print head 24 is improved, the ink bag 14 can be made a separate unit that can be attached to the bladder/valve/print head unit. Therefore, instead of changing the entire unit 10 when the ink bag 14 runs out of ink, a certain number of ink bag cartridges could be replaced before the bladder/valve/-print head is changed.

INDUSTRIAL APPLICABILITY

The ink delivery system 10 of the invention is useful in plotters driven by computers to provide drawings.

Thus, there has been provided an ink delivery system, comprising an ink bag for storing a quantity of ink, a print head for delivering a supply of ink to a printing medium, a bladder for providing a supply of ink to the print head, a three-way valve for alternately conveying ink from the ink bag to the bladder and from the bladder to the print head, and means for supporting the ink bag, the bladder, the print head and the three-way valve in cooperative association.

It will be obvious to those of ordinary skill in the art that numerous changes and modifications may be made without departing from the spirit and scope of the invention. All such changes and modifications are intended to fall within the scope of the invention, as defined by the appended claims.

What is claimed is:

1. An ink delivery system comprising in combination:

(a) an ink bag for storing a quantity of ink;

(b) a print head for delivering ink to a printing medium;

(c) a bladder for providing a supply of ink to said print head;

(d) a valve for providing a closed mode, a refill mode for conveying ink from said ink bag to said bladder, and a print mode for conveying ink from said bladder to said print head; and (e) means for supporting said ink bag, said bladder, said print head and said valve in cooperative association.

2. The ink delivery system of claim 1 wherein said ink bag comprises a material impervious to air and water.

3. The ink delivery system of claim 2 wherein said ink bag comprises an aluminum-coated plastic bag.

4. The ink delivery system of claim 1 wherein said print head comprises a plurality of nozzles in a nozzle plate.

5. The ink delivery system of claim 1 wherein said bladder comprises an elastomeric material.

6. The ink delivery system of claim 5 wherein said bladder comprises a resilient ethylene propylene.

7. The ink delivery system of claim 1 wherein said bladder is capable of delivering ink at a negative pressure between about −0.5 and −6 inches of water.

8. The ink delivery system of claim 7 wherein said bladder is capable of delivering ink at a negative pressure between about −1 and −3 inches of water.

9. The ink delivery system of claim 1 wherein said valve comprises a cylindrically-shaped, hollow valve body, with a first opening provided near one end thereof and a second opening provided near an opposite end thereof, both on the same side of said cylindrically shaped body, with a pair of opposed openings near said opposite end thereof and positioned about 75° on said cylindrically shaped body from said second opening, and with a rotatable means provided at said opposite end.

10. The ink delivery system of claim 9 further comprising a plenum chamber mounted on said platform for containing said valve, with said print head mounted on said plenum chamber, and for distributing ink from said ink bag to said bladder and from said bladder to said print head.

11. An ink delivery system comprising in combination:

(a) an ink bag for storing a quantity of ink, said ink bag comprising a material impervious to air and water;

(b) a print head for delivering ink to a printing medium;

(c) a bladder for providing a supply of ink to said print head, said bladder comprising an elastomeric material;

(d) a three-way valve for providing a closed mode, a refill mode for conveying ink from said ink bag to said bladder, and a print mode for conveying ink from said bladder to said print head, said three-way valve comprising a cylindrically-shaped, hollow valve body, with a first opening provided near one end thereof and a second opening provided near an opposite end thereof, both on the same side of said cylindrically shaped body, with a pair of opposed openings near said opposite end thereof and positioned about 75° on said cylindrically shaped body from said second opening, and with a rotatable means provided at said opposite end; and (e) a support plate for supporting said ink bag, said bladder, said print head and said three-way valve in cooperative association, with said ink bag and said bladder mounted on one side of said support plate and said print head and said three-way valve mounted on the other side of said support plate, with said support plate further provided with a plenum chamber for mounting said three-way valve therein and for distributing ink from said ink bag to said bladder and from said bladder to said print head.

12. The ink delivery system of claim 11 wherein said ink bag comprises an aluminum-coated plastic bag.

13. The ink delivery system of claim 11 wherein said print head comprises a plurality of nozzles in a nozzle plate.

14. The ink delivery system of claim 11 wherein said bladder comprises a resilient ethylene propylene.

15. The ink delivery system of claim 11 wherein said bladder is capable of delivering ink at a negative pressure between about −1 and −3 inches of water.

* * * * *